United States Patent Office 2,734,911
Patented Feb. 14, 1956

2,734,911

REACTION OF CHLOROANILINE AND ISOPROPYL HALOFORMATE

Franklin Strain, Barberton, Ohio, assignor to Columbia-Southern Chemical Corporation, Allegheny County, Pa., a corporation of Delaware No Drawing. Application August 7, 1952,
Serial No. 303,167

7 Claims. (Cl. 260—471)

This invention relates to a novel method of preparing isopropyl N-chlorophenyl carbamates.

According to this invention, isopropyl N-monochlorophenyl carbamates and isopropyl N-polychlorophenyl carbamates may be prepared by reacting an isopropyl haloformate with an appropriate mono or polychloroaniline, preferably in the presence of a hydrogen halide acceptor. The reaction may be represented by the following equation:

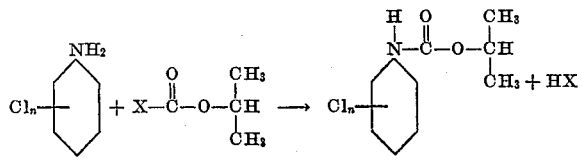

where $n$ is a whole integer from 1 to 5 inclusive and X is a halogen.

In general, isopropyl chloroformate is employed, although the bromo, fluoro, or iodo isopropyl formates may be used interchangeably either individually or as mixtures. Any chloroaniline or combination of chloroanilines may be reacted to prepare the corresponding carbamate or carbamate mixture. Thus, isopropyl N-2 chlorophenyl carbamate is prepared by reacting orthochloroaniline (2 chloroaniline) in accordance with this invention. Similarly, an isopropyl N-polychlorophenyl carbamate is produced by employing a polychloroaniline as a reactant. Suitable chloroanilines therefore include the ortho, meta and para monochloroanilines; dichloroanilines such as 2,3 dichloroaniline, 2,5 dichloroaniline and the like, trichloroanilines such as sym. trichloroaniline (2,4,6 trichloroaniline); tetrachloroanilines and pentachloroaniline.

Various basic materials may be employed as halogen halide acceptors. Inorganic bases such as the oxides, hydroxides, carbonates and bicarbonates of sodium, potassium, calcium, barium, strontium, and magnesium or other alkaline earth metal or alkali metal; organic bases including pyridine, dimethyl aniline quaternary ammonium bases such as trimethyl phenyl ammonium hydroxide are among those bases which may be employed in the reaction. When water soluble basic materials are used, such as sodium hydroxide, aqueous solutions thereof are frequently employed.

The reaction may be carried out in the presence of inert organic solvents, i. e., solvents free from hydroxy or amino groups which will react with the isopropyl haloformates. The solvent should be readily separable from the isopropyl N-chlorophenyl carbamate product, such as by distillation. It should also provide an organic phase with the carbamate product in the reaction mixture that has a specific gravity which facilitates physical separation of the organic phase from any aqueous phase that may be present. Thus, a solvent which with the carbamate provides an organic phase having a specific gravity either substantially more than or less than 1, such as below about 0.8 or above about 1.2, is most desirable. Appropriate solvents include halogenated hydrocarbons such as carbon tetrachloride, chloroform, ethylene dichloride, perchloroethylene, etc.; benzene; xylene; toluene; ketones such as acetone and the like.

The reaction is performed at temperatures above the freezing point of the reaction mixture, and preferably below about 15° C. Frequently, the reaction temperature is maintained at between 0° C. and 10° C. Higher temperatures may also be employed, but in general provide somewhat lower yields.

The reaction is carried out by mixing an isopropyl haloformate with a chloroaniline. This may be effected in various ways. For example, isopropyl chloroformate may be added to a reaction mixture of metachloroaniline and an appropriate base employing substantially equimolar amounts of each reactant, while maintaining the reaction temperature between 0° C. and 15° C. It is also possible to employ an excess of metachloroaniline, and thereby use a correspondingly smaller amount of base. The excess aniline serves as a hydrogen chloride acceptor by formation of its hydrochloride. Alternatively, the base may be added to a mixture of metachloroaniline and isopropyl chloroformate.

While equimolar amounts of reactants are used, it is often desirable to employ a slight excess of the base, i. e., a 5 to 10 mole per cent excess, based on the amount of chloroaniline used. Likewise, it is to be understood that the reaction may be carried out even though the ratio of the reactants is varied considerably.

The use of a solvent in the reaction is preferred, although not essential. A solvent is employed when the particular chloroaniline is a solid at the reaction temperature to provide a liquid reaction mixture. Likewise, when the reaction product, the carbamate, is solid under reaction conditions, a solvent is incorporated into the mixture to dissolve the product. This may be done by either originally including the solvent in the reaction mass or by adding it at the conclusion of the reaction.

When solvent is employed, one procedure involves adding isopropyl chloroformate to a mixture of a chloroaniline, such as metachloroaniline, a base such as an aqueous solution of sodium hydroxide and a solvent such as perchloroethylene while maintaining a reaction temperature from 5° C. to 10° C. The reaction may also be effected by adding the base to a mixture of the chloroaniline, solvent and isopropyl chloroformate.

Recovery of the carbamate product from the reaction mixture may be effected by numerous procedures. For example, the organic phase of the reaction mixture may be separated from the aqueous phase and then treated with dilute aqueous hydrochloric acid. Generally, this step is performed by washing the organic phase with dilute acid. The pH of the organic phase is then raised to 7 or higher by washing with water, or preferably with dilute aqueous sodium hydroxide. Vacuum distillation at the appropriate pressure and temperature may be employed to separate the solvent and product. Recrystallization from appropriate materials, such as ethyl alcohol, is possible.

The following examples illustrate this invention:

*Example I*

Five moles (638 grams) of meta-chloroaniline were placed in a three-liter, three-necked, reaction flask equipped with a thermometer and nickel stirrer and two dropping funnels and stirred and cooled to 5° C. Five moles (612.5 grams) of isopropyl chloroformate and 5.25 moles (840 grams) of an aqueous solution of sodium hydroxide containing 25.5 per cent by weight of sodium hydroxide were added separately and simultaneously from each dropping funnel over a three-hour period while maintaining a reaction temperature of 0° C. to 10° C.

Stirring of the reaction mixture was continued for one hour after the addition was completed. Five hundred milliliters of benzene were added to effect a separation of the organic layers. The resulting benzene solution containing the product was washed twice with dilute hydrochloric acid and water. After drying the benzene solution over anhydrous sodium sulfate for 16 hours, the solution was filtered and distilled at a temperature of 140° C. at a pressure of 10 millimeters of mercury to give 1016.7 grams of isopropyl N-3-chlorophenyl carbamate. The product is a colorless viscous liquid which crystallizes slowly on standing at temperatures slightly below room temperature. It boils at 149° C. at two millimeters of mercury pressure, and has a melting point of 40.7 to 41.1° C. It has an index of refraction of $n^{20}{}_D$ 1.5388 and is readily soluble in acetone, xylene, toluene, ethyl alcohol, etc., but insoluble in water.

*Example II*

Using the apparatus described in Example I, 267.0 grams (2.1 moles—5 per cent excess) of isopropyl chloroformate and 176 grams (2.2 moles—10 per cent excess) of a 50 per cent by weight aqueous solution of sodium hydroxide were simultaneously added to a mixture of 255.0 grams (2.0 moles) of meta-chloroaniline and 200 milliliters of water over a period of 105 minutes while stirring. The reaction temperature was maintained at 5° C. to 10° C. Stirring was continued for 30 minutes after the conclusion of the addition of the reactants. Then 300 milliliters of perchloroethylene were added to the reaction mass to form an organic phase containing the product. The organic phase was separated from the aqueous phase and treated with an additional 10 grams of isopropyl chloroformate to reduce the metachloroaniline content in the organic phase below 100 parts per million. 404.4 grams of isopropyl N-3-chlorophenyl carbamate were prepared in this manner.

The following example illustrates a convenient method for carrying out the reaction on a large scale:

*Example III*

A reaction mixture of 800 pounds of water, 600 pounds of metachloroaniline and 1000 pounds of perchloroethylene was established in a jacketed reaction kettle. This mixture was then agitated by use of a turbo mixer while brine was circulated in the jacket until the temperature of the reaction mixture was about 4 or 5° C. (40° F.). Thereafter, a 50 per cent by weight aqueous sodium hydroxide solution and isopropyl chloroformate were simultaneously added from separate weight tanks to the reaction mixture in the ratio of 0.6 pounds of caustic to 1 pound of isopropyl chloroformate. Addition of these two reactants is done at a rate such that the reaction temperature may be maintained at between 4 and 5° C. Afer 710 pounds of isopropyl chloroformate and 425 pounds of caustic have been added, the addition is stopped and the mixture is agitated for 15 minutes.

If standard aniline tests reveal the presence of free chloroaniline in the reaction mixture batchwise addition of 10 pounds of a 50% aqueous sodium hydroxide solution and 15 pounds of isopropyl chloroformate are made until no chloroaniline is present.

Thereafter, the organic phase was separated from the inorganic phase by simple phase separation. The organic phase was then washed with two gallons of water and two gallons of hydrochloric acid. This washing was followed with a washing with 200 gallons of water and sufficient 50% aqueous sodium hydroxide solution to raise the pH of the mixture to 8.0.

The washed organic phase was then topped at 140° C. and 10 millimeters mercury to remove the perchloroethylene, and leaving the product as residue in a molten state.

*Example IV*

One mole (122.5 grams) of isopropyl chloroformate was added dropwise to a mixture of one mole (127.6 grams) of orthochloroaniline, 1.1 moles (84.0 grams—10 per cent excess over theoretical amount necessary) of sodium bicarbonate, and 300 milliliters of water while agitating the mixture. The reaction temperature was kept between 5° C. and 10° C. by cooling. After completion of addition of the chloroformate, the agitation was continued for 20 minutes with cooling discontinued. The reaction mixture was then acidified by the addition of dilute hydrochloric acid, and the organic layer was then separated. The organic layer was washed with dilute hydrochloric acid and water, and then dried over anhydrous sodium sulfate. After filtering, and topping at 30 millimeters of mercury pressure and 100° C. to remove the water, 193.8 grams of isopropyl N-2-chlorophenyl carbamate was obtained.

Analysis of this product showed it contained 17.7 per cent by weight of chlorine and 6.7 per cent by weight of nitrogen, as compared with theoretical values of 16.6 for chlorine and 6.7 for nitrogen in $ClC_6H_4NHOCOC_3H_7$. It is liquid and has an index of refraction of $n^{20}{}_D$ 1.5325. It is readily soluble in acetone, xylene, toluene, ethyl alcohol, etc., but insoluble in water.

*Example V*

One mole (122.5 grams) of isopropyl chloroformate was added dropwise over a period of 140 minutes to a mixture of one mole (162 grams) of 2,5-dichloroaniline, 1.1 moles (84.0 grams—10 per cent excess of the theoretical requirement) of sodium bicarbomate, 500 milliliters of benzene and 300 milliliters of water while agitating the mixture. The mixture was formed by dissolving the 2,5-dichloroaniline in benzene and mixing with water and sodium bicarbonate. The mixture was cooled to 5° C. before the chloroformate was added and was kept between 5° C. to 10° C. during the reaction by cooling. Agitation was continued for three hours and cooling discontinued after the chloroformate was completely added. The reaction mixture was then acidified by the addition of dilute hydrochloric acid, and the organic layer separated. The organic layer was washed with dilute hydrochloric acid and water, and then dried over anhydrous sodium sulfate. After filtering, and removing the benzene by topping at 25 millimeters of mercury pressure and 105° C. 195.2 grams of isopropyl N-2,5-dichlorophenyl carbamate were obtained. This material was recrystallized from ethyl alcohol and a white solid was obtained.

Analysis of this product showed it contained 29.6 per cent by weight of chlorine and 5.6 per cent by weight of nitrogen, as compared with theoretical values of 28.6 for chlorine and 5.6 for nitrogen $C_{10}H_{11}NCl_2O_2$. It has a melting point of 71–72° C. and is soluble in xylene, toluene, acetone, ethyl alcohol, etc., but insoluble in water.

*Example VI*

One mole (122.5 grams) of isopropyl chloroformate was added dropwise over a period of 140 minutes to a mixture of one mole (127.6 grams) of para-chloroaniline, 1.1 moles (84.0 grams—10 per cent excess of theoretical requirement) of sodium bicarbonate, 500 milliliters of benzene, and 300 milliliters of water, while agitating the mixture. The mixture was formed by dissolving the para-chloroaniline in the benzene and then mixing with water and sodium bicarbonate. Prior to adding the isopropyl chloroformate, the mixture was cooled to 5° C. During the course of the addition, the reaction temperature was maintained at between 5° C. to 10° C. by cooling. At the end of the addition period, cooling was discontinued; agitation was continued for three hours. The reaction mixture was then acidified by the addition of dilute hydrochloric acid, and the organic layer was then separated. The organic layer was washed with dilute hydrochloric acid and water, and then dried over anhydrous sodium sulfate. After filtering, and topping off the benzene at 25 millimeters of mercury pressure and 105° C., 206 grams of isopropyl N-4-chlorophenyl carbamate was obtained. This product was recrystallized from ethyl alcohol to obtain a white solid product.

Analysis of the product showed it contained 17.4 per cent by weight of chlorine and 6.4 per cent by weight of nitrogen, as compared with theoretical values of 16.6 for chlorine and 6.7 for nitrogen in $ClC_6H_4NHOCOC_3H_7$. It has a melting point of 104–105° C. and is soluble in ethyl alcohol, xylene, toluene, etc., but insoluble in water.

The process of this invention, while described with respect to batch operation, may be carried out in continuous operations. For example, the reactants may be continuously added to a reaction zone while simultaneously withdrawing corresponding amounts of the reaction mixture. Any unused reactants, as well as the solvent, may be returned to the reaction zone.

The isopropyl N-monochlorophenyl carbamates and isopropyl N-polychlorophenyl carbamates which may be prepared according to this invention are valuable for use as herbicides, particularly for killing weeds and like broad leaf plants. They may be formulated with appropriate diluents, dispensants, etc., alone, in admixture with one another, or together with other known herbicides.

Although the present invention has been described with reference to the specific details of certain embodiments, it is not intended that such details shall be regarded as limitations upon the scope of the invention except insofar as included in the accompanying claims.

What is claimed:

1. A method of preparing an isopropyl N-chlorophenyl carbamate by reaction of an isopropyl haloformate and a chloroaniline in the presence of a hydrogen halide acceptor which comprises establishing a liquid body containing the chloroaniline and simultaneously and individually adding the isopropyl haloformate and hydrogen halide acceptor to the liquid body under conditions conducive to the preparation of the carbamate.

2. A method of preparing isopropyl N-3-chlorophenyl carbamate which comprises establishing a liquid body containing meta-chloroaniline and simultaneously and individually adding isopropyl chloroformate and a hydrogen halide acceptor to the liquid body under conditions conducive to the reaction of the isopropyl chloroformate and meta-chloroaniline and consequent isopropyl N-3-chlorophenyl carbamate production.

3. A method of preparing isopropyl N-3-chlorophenyl carbamate by reaction of isopropyl chloroformate and meta-chloroaniline in the presence of a hydrogen halide acceptor which comprises establishing a liquid body containing meta-chloroaniline, simultaneously and individually adding isopropyl chloroformate and an aqueous solution of an inorganic hydrogen halide acceptor to the meta-chloroaniline under conditions conducive to the preparation of isopropyl N-3-chlorophenyl carbamate.

4. A method of preparing an isopropyl N-chlorophenyl carbamate by reaction of an isopropyl haloformate and a chloroaniline in the presence of a halogen halide acceptor which comprises establishing a liquid body containing a chloroaniline, simultaneously and individually adding an isopropyl haloformate and a hydrogen halide acceptor to the body while maintaining the temperature of the contents of the liquid body between 0 and 15° centigrade throughout substantially the entire reaction.

5. A method of preparing an isopropyl N-chlorophenyl carbamate which comprises establishing a liquid body containing a chloroaniline and an inert organic solvent, initiating the reaction by simultaneously and individually adding an isopropyl haloformate and a hydrogen halide acceptor to the liquid body, continuing the simultaneous and individual addition of the isopropyl haloformate and the hydrogen halide acceptor to the liquid body during the course of the reaction until at least about one mole of the isopropyl haloformate and at least about one mole of the hydrogen halide acceptor per mole of the chloroaniline in the liquid body are added and maintaining the temperature of the body between 0 and 15° centigrade at least throughout the addition of material.

6. A method of preparing an isopropyl N-chlorophenyl carbamate which comprises establishing a liquid body containing a chloroaniline, simultaneously and individually adding an isopropyl haloformate and a hydrogen halide acceptor to the body, maintaining the temperature of the body between 0 and 15° centigrade throughout the addition of the materials, agitating said liquid body throughout the addition of isopropyl haloformate and hydrogen halide acceptor, halting the addition of said materials after at least about one mole each thereof per mole of chloroaniline in the body have been added, and continuing said agitation for at least 15 minutes after halting the addition of materials.

7. A method of preparing an isopropyl N-3-chlorophenyl carbamate which comprises establishing a liquid body of meta-chloroaniline, simultaneously and individually adding isopropyl chloroformate and a hydrogen halide acceptor to the body, maintaining the temperature of the body between 0 and 15° centigrade and agitating the body throughout the course of the addition of isopropyl haloformate and hydrogen halide acceptor, halting the addition after at least about one mole of the chloroformate and one mole of the hydrogen halide acceptor per mole of metachloroaniline in the body have been added, and continuing the agitation at least 15 minutes after halting the addition of materials.

References Cited in the file of this patent

UNITED STATES PATENTS

| | | |
|---|---|---|
| 2,026,619 | Etzelmiller | Jan. 7, 1936 |
| 2,041,733 | Werntz | May 26, 1936 |
| 2,573,420 | Engel | Oct. 30, 1951 |

OTHER REFERENCES

Wilson: Agricultural Chemicals, page 37, Feb. 1951, 71–2.6.

Beilstein: Handbuch Der Organischen Chemie, Vierte Auflage, vol. 12, pg. 321.